(12) United States Patent
Ciarniello et al.

(10) Patent No.: US 10,237,732 B2
(45) Date of Patent: Mar. 19, 2019

(54) MOBILE DEVICE AUTHENTICATION IN HETEROGENEOUS COMMUNICATION NETWORKS SCENARIO

(71) Applicant: TELECOM ITALIA S.p.A., Milan (IT)

(72) Inventors: Alberto Ciarniello, Rome (IT); Alessandro Simonetti, Rome (IT)

(73) Assignee: TELECOM ITALIA S.p.A., Milan (IT)

( * ) Notice: Subject to any disclaimer, the term of this patent is extended or adjusted under 35 U.S.C. 154(b) by 510 days.

(21) Appl. No.: 14/896,551

(22) PCT Filed: Jun. 11, 2014

(86) PCT No.: PCT/EP2014/062070
§ 371 (c)(1),
(2) Date: Dec. 7, 2015

(87) PCT Pub. No.: WO2014/198745
PCT Pub. Date: Dec. 18, 2014

(65) Prior Publication Data
US 2016/0127902 A1    May 5, 2016

(30) Foreign Application Priority Data

Jun. 12, 2013 (WO) ................. PCT/EP2013/062163

(51) Int. Cl.
*H04W 12/06* (2009.01)
*H04L 29/06* (2006.01)
(Continued)

(52) U.S. Cl.
CPC .......... *H04W 12/06* (2013.01); *G06F 21/335* (2013.01); *G06F 21/43* (2013.01);
(Continued)

(58) Field of Classification Search
None
See application file for complete search history.

(56) References Cited

U.S. PATENT DOCUMENTS

| | | | |
|---|---|---|---|
| 6,775,298 B1 * | 8/2004 | Aggarwal | H04L 67/06 370/219 |
| 2007/0169189 A1 * | 7/2007 | Crespo | G06F 21/6227 726/20 |

(Continued)

FOREIGN PATENT DOCUMENTS

| | | |
|---|---|---|
| GB | 2 458 470 A | 9/2009 |
| WO | 2013/067601 A2 | 5/2013 |

OTHER PUBLICATIONS

International Search Report and Written Opinion dated Oct. 9, 2014 in PCT/EP14/062070 Filed Jun. 11, 2014.

*Primary Examiner* — Michael R Vaughan
(74) *Attorney, Agent, or Firm* — Oblon, McClelland, Maier & Neustadt, L.L.P.

(57) ABSTRACT

A method and device for authenticating a user of a communication device accessing an online service. The online service is accessible over a data network and is provided through a service platform. The communication device is connected to a mobile phone network and to the data network. The communication device includes an interface software application configured to interact with the service platform through the data network for fruition of the online service, and a messaging function configured to send messages through the mobile phone network. A user-side authentication application is provided at the communication device, a provider-side authentication application is provided at the service platform, and an authentication control function is provided in communication relationship with the provider-side authentication application and with the mobile phone network.

18 Claims, 4 Drawing Sheets

(51) Int. Cl.
  *H04W 4/12*     (2009.01)
  *G06F 21/33*    (2013.01)
  *G06F 21/43*    (2013.01)
  *H04W 76/10*    (2018.01)
  *H04W 88/06*    (2009.01)

(52) U.S. Cl.
  CPC ...... *H04L 63/0428* (2013.01); *H04L 63/0838* (2013.01); *H04L 63/18* (2013.01); *H04W 4/12* (2013.01); *H04W 76/10* (2018.02); *H04L 63/067* (2013.01); *H04L 63/0846* (2013.01); *H04W 88/06* (2013.01)

(56) References Cited

U.S. PATENT DOCUMENTS

| | | |
|---|---|---|
| 2008/0152099 A1 | 6/2008 | Bilstad et al. |
| 2010/0029249 A1 | 2/2010 | Bilstad et al. |
| 2010/0275020 A1* | 10/2010 | Aramaki ............. H04L 63/0869 713/170 |
| 2010/0325441 A1* | 12/2010 | Laurie .................... G06F 21/31 713/185 |
| 2011/0078773 A1 | 3/2011 | Bhasin et al. |
| 2011/0249079 A1 | 10/2011 | Santamaria et al. |
| 2011/0250909 A1 | 10/2011 | Mathias et al. |
| 2011/0252146 A1 | 10/2011 | Santamaria et al. |
| 2012/0233685 A1 | 9/2012 | Palanigounder et al. |
| 2013/0080332 A1 | 3/2013 | Bilstad et al. |
| 2013/0103685 A1* | 4/2013 | Preneel ............ G06F 17/30339 707/736 |
| 2013/0231146 A1 | 9/2013 | Mathias et al. |
| 2014/0006775 A1* | 1/2014 | Dixon ................... H04L 63/123 713/155 |
| 2014/0310514 A1* | 10/2014 | Favero ................. H04L 9/0869 713/153 |
| 2016/0057139 A1* | 2/2016 | McDonough ....... H04L 63/0861 726/6 |
| 2018/0196950 A1* | 7/2018 | Heyner ................ G06F 21/602 |

* cited by examiner

MOBILE DEVICE AUTHENTICATION IN HETEROGENEOUS COMMUNICATION NETWORKS SCENARIO

BACKGROUND OF THE INVENTION

Field of the Invention

The present invention generally relates to the field of telecommunications, telecommunication devices, telecommunication networks and online services. In particular, the present invention relates to an authentication system and method for a user to safely access online services (i.e., services made available by service providers accessible through a packet data network like the Internet or an intranet), which he/she has subscribed (hereinafter, these online services are also referred to as dedicated services). More specifically, the present invention relates to an authentication system and method for simply and effectively enforcing authorized access to dedicated services from mobile devices regardless of the communication network used to access such dedicated services and the service provider providing such dedicated service.

Overview of the Related Art

An increasing number of online services are made accessible by service providers over the Internet. Many online services (e.g., e-mail, online newspapers, online banking, e-commerce services, music or video download or streaming, TV or video on demand etc.) require user authentication at each access to securely identify users and enable access only to users who subscribed to the specific service or otherwise possess the right user conditions to access the service.

The widespread diffusion of communication devices, particularly mobile communication devices such as smartphones, tablets, mobile connected PCs, etc., capable of accessing a plurality of telecommunication networks at once, especially packet data networks, through different radio access technologies like GPRS-EDGE or HSDPA-HSUPA over 2G-3G mobile (cellular) phone networks, 4G mobile phone networks, and Wi-Fi® wireless networks, and/or through wired access technologies (e.g. via ADSL modems or Ethernet connections) has brought forth the problem of how to enforce an authentication process that allows users to safely access their dedicated services automatically or with minimal user intervention, irrespective of the telecommunication network used to access the service.

Indeed, different telecommunication networks implement different (if any) authentication systems and/or have different security levels during the transmissions of signals.

Mobile (cellular) phone/data networks typically comprise a safe and transparent-to-the-user authentication system (hereinafter also referred to as "mobile authentication") for access to online services relying on the network-based authentication of MSISDN (Mobile Subscriber ISDN Number) identification and use encrypted transmissions. The MSISDN is a univocal code, known to the user, associated with a user subscription and with a user's SIM (Subscriber Identity Module). It is used for identification of the user in the telephone and data services provided by the mobile network and allows to safely and unambiguously identifying a user requesting access to a subscribed service through the mobile phone network. An online service made available by a service provider through a mobile portal, reachable through the mobile phone/data network, can be easily, safely and automatically accessed by the user over the mobile phone network (without the need for the user to input access credentials) because the MSISDN (whose level of trust is guaranteed by the mobile phone network) can be transferred by the mobile phone network to the service provider through suitable and secure techniques (for example via well known practices of http header enrichment or suitable APIs providing the service provider with the MSISDN corresponding to a specific IP address assigned by the mobile network to the communication device).

On the other hand, communications through PDNs (Packet Data Networks), and particularly wireless PDNs such as for example WPAN, WLAN, WMAN, WWAN—Wireless Personal, Local, Metropolitan, and Wide Area Network, respectively—, also known as Wi-Fi® networks, are relatively unsafe. Indeed, the communications over PDNs do not have the intrinsic access and transmission security level featured by mobile phone networks and in general require a specific user authentication system to authenticate the user. For example, the most common wireless encryption-standards, Wired Equivalent Privacy (WEP) and Wi-Fi® Protected Access (WPA and WPA2) have been shown to be breakable. Moreover, PDNs do not comprise a univocal identifier for users accessing the same, and the user authentication is usually performed by means of static passwords or temporary passwords (such as OTPs—One Time Passwords) both requiring also a certain degree of user intervention at each access.

Since communication devices are capable of accessing a plurality of telecommunication networks at once, and are often set (e.g. by the user) for automatically selecting the telecommunication network to be used to access the dedicated services usually according to economic and/or transmission speed criteria, such a lack of uniformity in the user authentication, and related safety or trust level, among different telecommunication networks results in an inability of the online service providers and/or the telecommunication network operators to extend the use of mobile authentication when users access services via Wi-Fi® and/or require additional complexity for ensuring uniform user authentication for online services.

In the art, some solutions have been proposed for relieving such issue.

For example, the EAP-SIM (Extensible Authentication Protocol) technique in GSM-type networks is used for authentication and session key distribution using the SIM to carry out user authentication. EAP-SIM uses a SIM authentication algorithm between the client and an Authentication, Authorization and Accounting server providing mutual authentication between the client and the network. EAP-SIM is for example described in detail in RFC 4186.

WO 01/72009 discloses a method and apparatus for a single sign-on method and system for accessing a plurality of services distributed over a network in which authentication-related functionality is separated from the services, and in which authentication needs not be renegotiated for access to a new service from the plurality of services during a session. A notification of the plurality of services when a user has terminated a session, and the use of secure, short-lived authentication tokens to verify a user's identity for subsequent access to the plurality of services are used. The method comprises receiving a request from a user for authorization to access a service; transmitting a token corresponding to the service to the user; receiving the token corresponding to the service from the user; determining whether the user is authorized to receive the service based on the token; and connecting the user to the service, if the user is authorized to use the service.

WO 01/17310 discloses a communication method and apparatus that apply GSM security principles to authenticate users who are requesting access to packet data networks. The authentication process is triggered by an authenticating entity when it needs to verify the identity of a user trying to access certain resources, e.g., an application of a network. The authenticating entity sends an authentication request to an authentication server. The authentication server checks whether the user's identity corresponds to a known user. If so, the authentication server generates an authentication token that is sent to the user via an access network and a remote host. The authentication server uses a secure communication link, via a wireless network, to request the user to send the authentication token back to the authentication server via the secure communication link over a public land mobile network. Once the user sends the authentication token back to the authentication server via the secure channel, the authentication server compares the authentication token sent to the user and received from the user through the secure communication link. If the authentication tokens match, the authentication server instructs the authenticating entity to grant the user access to the requested services. If the authentication tokens do not match, the user will be denied access to the requested services.

US 2009/0228966 discloses an authentication method in which a token is associated with a mobile device and a user of a remote computer, it is established that the token at the mobile device and remote computer match and the token at the mobile device and remote computer is updated during a connection. Preferably, a two factor authentication method is employed in which password authentication is the second factor.

US 2011/249079 discloses transitioning between an audio only circuit switched call and a video call. A client device, which is currently connected to one or more other client devices through an established audio only circuit switched call, receives input from a user to transition from the audio only circuit switched call to the video call. A video call invitation message is transmitted to the other client devices. The client device receives a video call accept message from the other client devices and begins transmitting video captured by its front facing camera to the other client devices. Responsive to receiving at least a video frame from each of the one or more other client devices, the client device transitions from the audio only circuit switched call to the video call. After transitioning to the video call, the circuit switched call is dropped.

WO 2013/067601 discloses a method for transmitting an encrypted message from a messaging server to a handset comprising the steps of receiving, at the messaging server and from a sender computer, a message to be sent to the handset and a handset identifier associated with the handset and determining that the handset is not registered with the messaging server by determining that the handset identifier does not have an associated handset encryption key stored at the messaging server. The handset is registered by sending a notification to the handset requesting registration, receiving back a handset encryption key associated with the handset identifier; and storing the handset encryption key against the handset identifier at the messaging server which is to be used to encrypt the received message before sending. Prior to registering the handset, intermediate encryption of the message may be employed to create an intermediate encrypted message to be stored at the messaging server.

SUMMARY OF THE INVENTION

The Applicant has found that the known solutions mentioned above fail in ensuring satisfactory authentication systems and methods adapted to provide a single authentication procedure for enabling access to dedicated services provided by a plurality of different service providers through different communication networks.

Indeed, the EAP-SIM authentication technique has a high implementation complexity in the telecommunication networks and its integration with service provider infrastructures (servers, repository, etc.) is not straightforward.

In both WO 01/72009 and WO 01/17310 the token generated by the system is forwarded to the user via a wireless communication link. Such wireless communication link may be easily spied and a third party may be able to retrieve and unduly use the token.

In US 2009/0228966 the method described requires a series of actions, such as reaching a provider facility (e.g., a bank office) by a person, using a computer wired to the network, or a cable telephone, that make the same unsuitable for a fast (i.e., real-time) access to the dedicated services.

Therefore, the Applicant has coped with the problem of devising a satisfactory solution able to provide a fast and reliable authentication for accessing dedicated services requiring a minimal user interaction.

Particularly, one aspect of the present invention proposes a communication device. The communication device is adapted to be used by a user for accessing an online service, accessible over a data network and being provided through a service platform. The communication device is connectable both to a mobile phone network and to the data network. The communication device comprises an interface software application adapted to interact with the service platform through the data network for the fruition of said online service and, subject to secure user authentication, to allow fruition of the online service by the user. Moreover, the communication device comprises a messaging function adapted to send messages through the mobile phone network. In the solution according to an embodiment of the present invention, the communication device further comprises a user-side authentication application configured to generate a digital token and to generate a message, including the digital token, to be sent by the messaging function to an authentication control function connected to the mobile phone network. The user-side authentication application is further configured to generate at least one resource code, including the digital token and identifying the online service for which access is requested at the service platform, to be sent by the interface software application to the service platform via the data network for the user authentication.

Preferred features of the present invention are set forth in the dependent claims.

According to an embodiment of the present invention, the user-side authentication application is further configured to encrypt in the digital token information. Such information comprises a generation timestamp indicating a time instant at which the digital token was generated by the user-side authentication application, and an identifier of the online service to be accessed.

In a further embodiment of the present invention, the user-side authentication application is further configured to encrypt in the message additional information. Such additional information comprises a validity time indicating a time period for which the digital token is valid.

According to an embodiment of the present invention, said user-side authentication application is further configured to generate, in addition to said digital token, at least one additional token, preferably a number of additional tokens, to be stored at the communication device.

In a further embodiment of the present invention, the user-side authentication application is further configured to encrypt in the message additional information. The additional information further comprises at least one among an integer number corresponding to said number of additional tokens, a coding key for generating a plurality of additional digital tokens based on the digital token, a unique identification code for the communication device, information on the communication device type, an indication of the version of the user-side authentication application implemented at the communication device, an installation timestamp indicating a time at which the user-side authentication application was installed on the communication device, and a code identifying the mobile phone network to which the communication device is connected.

According to an embodiment of the present invention, the user-side authentication application is further configured to provide the message to the messaging function. The messaging function is configured to establish a message link with a messaging management center comprised in the mobile phone network for sending the message to the authentication control function. The message link is associated with a univocal identifier of the user of the communication device.

In a further embodiment of the present invention, the messaging function is further configured to send the message through the message link automatically without intervention of the user.

In one embodiment of the invention, the user-side authentication application is further configured to provide the at least one resource code to the interface software application. The interface software application is configured to establish a communication link via the data network with the service platform for sending the resource code thereto.

Another aspect of the present invention proposes an authentication control function adapted to authenticate a user accessing an online service, accessible over a data network and being provided through a service platform, by means of a communication device being at least connected to both a mobile phone network and the data network. In the solution according to an embodiment of the present invention, the authentication control function is in communication relationship with the service platform and with the mobile phone network. The authentication control function is configured to extract a digital token comprised in at least one message sent from the communication device via the mobile phone network to the authentication control function, and extract a digital token from at least one authentication request message sent from the service platform to the authentication control function. Moreover, the authentication control function is configured to compare the digital tokens received from the mobile communication device and from the service platform and to notify to the service platform of a successful user authentication in case the two digital tokens match.

Preferred features of the present invention are set forth in the dependent claims.

According to an embodiment of the present invention, the authentication control function is further configured to extract a generation timestamp from the digital token extracted from said message sent from the communication device, extract a validity time from additional information comprised in the message sent from the communication device, receive from the mobile phone network a univocal identifier of the user of the communication device. Moreover, the authentication control function is further configured to verify if a time period indicated in the validity time has elapsed from the time instant indicated in the generation timestamp.

In a further embodiment of the present invention, the authentication control function is further configured to extract from additional information comprised in the message a number indicative of a number of additional digital tokens, a coding key for generating, based on the digital token, a number of additional digital tokens corresponding to said extracted number. Moreover, the authentication control function is further configured to generate said number of additional digital tokens.

According to an embodiment of the present invention, the authentication control function is further configured to extract from additional information comprised in the message a unique identification code for the communication device, information on the communication device type, an indication of the version of the user-side authentication application implemented at the communication device, an installation timestamp indicating a time at which the user-side authentication application was installed on the communication device, and a code identifying the mobile phone network to which the communication device is connected.

In a further embodiment of the present invention, the authentication control function is provided within the mobile phone network, and further configured to communicate with two or more service platforms.

According to an embodiment of the present invention, the authentication control function is co-located at the service platform.

Another aspect of the present invention proposes a service platform adapted to provide at least one online service, accessible over a data network upon authentication of a user requesting access to said online service, by means of a communication device being at least connected to both a mobile phone network and to the data network. In the solution according to an embodiment of the present invention, a provider-side authentication application is provided at the service platform. The provider-side authentication application is configured to extract a digital token from at least one resource code received at the service platform. The resource code identifies the online service for which access is requested by the user, generates at least one authentication request message comprising the received digital token, and sends the authentication request message to an authentication control function via a high-security communication link. The provider-side authentication application is further configured to receive a successful authentication message from said authentication control function, whereby the service platform grants to the user access to the online service.

Preferred features of the present invention are set forth in the dependent claims.

According to an embodiment of the present invention, the provider-side authentication application is further configured to extract a univocal identifier of the user of the communication device from the successful authentication message.

Another aspect of the present invention proposes an authentication system adapted to authenticate a user accessing an online service, accessible over a data network and being provided through a service platform, by means of a communication device being at least connected to both a mobile phone network and to the data network. In the solution according to an embodiment of the present invention, the authentication system comprises such communication device, such authentication control function, and one of such service platform according to any one of the preceding claims.

Another aspect of the present invention proposes an authentication method for authenticating a user accessing an online service, accessible over a data network and being provided through a service platform, by means of a mobile communication device being at least connected to a mobile phone network and to the data network. The communication device comprises an interface software application adapted to interact with the service platform through the data network for the fruition of said online service, and a messaging function adapted to send messages through the mobile phone network. A user-side authentication application is provided at the mobile communication device. A provider-side authentication application is provided at the service platform. An authentication control function is provided in communication relationship with the provider-side authentication application and with the mobile phone network. The method comprises the phase of generating, by means of the user-side authentication application, a digital token at the communication device. The method comprises the phase of generating, by means of the user-side authentication application, a message, including the digital token, at the communication device. The method comprises the phase of sending, by means of the messaging function, the message from the communication device to the authentication control function connected to the mobile phone network. The method comprises the phase of generating, by means of the user-side authentication application, at least one resource code at the communication device including the digital token and identifying the online service for which access is requested at the service platform. The method comprises the phase of sending, by means of the interface software application, the resource code from the communication device to the service platform via the data network for the user authentication. The method comprises the phase of extracting, by means of the provider-side authentication application, the digital token from the resource code received at the service platform. The method comprises the phase of generating, by means of the provider-side authentication application, at least one authentication request message comprising the received digital token at the service platform. The method comprises the phase of sending, by means of the provider-side authentication application, the authentication request message from the service platform to the authentication control function via a high-security communication link. The method comprises the phase of extracting, at the authentication control function, the digital token comprised in the message sent from the communication device via the mobile phone network and forwarded to the authentication control function. The method comprises the phase of extracting, at the authentication control function, the digital token from the authentication request message sent from the service platform to the authentication control function. The method comprises the phase of comparing, at the authentication control function, the digital tokens received from the communication device and from the service platform at the authentication control function, and sending a successful authentication message from the authentication control function to the service platform indicating a successful user authentication in case the two digital tokens match, whereby the service platform grants to the user access to the online service.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION OF THE INVENTION

Figure 1:
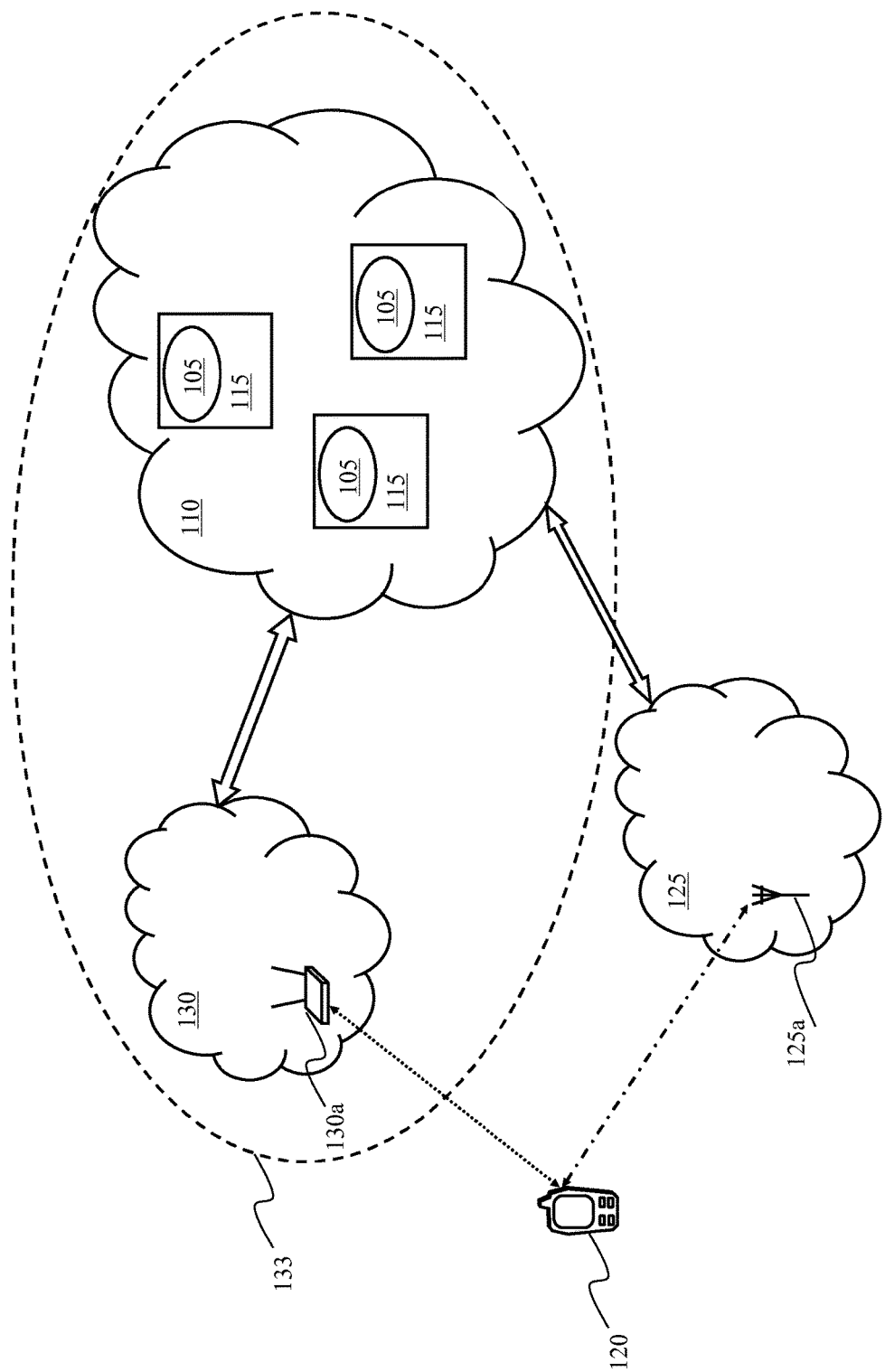
FIG. 1 is a schematic view of a scenario in which an embodiment of the present invention may be implemented.

With reference to the drawings, FIG. 1 is a schematic view of a scenario in which an embodiment according to the present invention may be implemented. A plurality of dedicated on-line services 105 (e.g., e-mail, online newspapers, online banking, e-commerce services, music or video download or streaming, TV or video demand etc.) are available in a packet data network 110, such as the Internet, which is a public, open packet data network (even though the packet data network 110 through which the dedicated services 105 are made available may be a private packet data network such as an intranet of an enterprise). Such dedicated services 105 are provided by service providers (e.g., an e-mail system provider, a content service provider, a bank, etc.) usually by means of service platforms 115, for example, web portals implemented in one or more servers, data repositories etc. (not shown in the figure).

A user may access subscribed dedicated services 105 with a user communication device 120, for example a mobile communication device (e.g., a smartphone, a tablet, a personal digital assistant or a wearable communication device, or a personal computer) by establishing a connection with the corresponding service platform 115 through one out of a plurality of telecommunication networks available in a geographic region where the user is located.

In the example at issue, the communication device 120 is assumed to be adapted to establish a connection to both a mobile phone network 125 (such as a 2G, 3G and 4G mobile phone network), typically via radio base stations 125a and associated mobile network nodes and functions. Such a functionality is inherent to mobile communication devices like smartphones and, in some cases, tablets, etc, while other types of communication devices like connected set-top boxes and personal computers may establish a connection to the mobile phone network 125 exploiting for example Internet keys equipped with SIM/USIM cards or embedded communication modules equipped with SIM/USIM cards.

The communication device 120 is also assumed to be adapted to establish a connection to a nearby packet data network (either a wired network or Wi-Fi® network) such as a Wireless LAN (Local Area Network), or WLAN 130, for example via a Wi-Fi® access point 130a (since both the radio base station 125a and the access point 130a are well known in the art they are not herein described any further). Both the mobile phone network 125 and the WLAN 130 are adapted to establish communication links with the Internet 110. For example, the mobile phone network 125 may connect to the Internet 110 via a GPRS (General Packet Radio Service), or equivalent, infrastructure (not shown), while the WLAN 130 may connect to the Internet 110 via a (e.g., ADSL) modem and related fixed network equipments (not shown). The WLAN 130 and the Internet 110 interconnected to each other (and possibly to other packet data networks) may be considered as belonging to a global packet data network, or simply data network 133, based on common communication protocols, typically the TCP/IP protocol.

Authentication performed by the user of the communication device 120 through the mobile phone network 125 is intrinsically secure, thanks to the implemented standard protocols (e.g. 3GPP TS33.x series of specifications, well known in the art and thus not herein described). Such communications are inherently authenticated by a univocal identifier of the user of the communication device 120, such as the MSISDN (Mobile Subscriber Integrated Services Digital Network-Number) in GSM (Global System for Mobile communications), UMTS (Universal Mobile Telecommunications System) and LTE (Long term Evolution) mobile phone networks, which is a number univocally associated with a customer using a specific SIM (Subscriber Identity Module) card upon subscription with a mobile phone network operator and inserted into, or associated with, the communication device 120 (also well known in the art and thus not herein further described).

Conversely, when access to the service platform 115 is performed through WLAN 130 a separate authentication system has to be implemented such as one based on access credentials which may comprise a so called One Time Password sent from the service platform 115 to the communication device 120 via SMS or the MSISDN entered by the end user in the appropriate login function of the service platform 115. WLAN access therefore has no inherent authentication system and has a far lower security level than communications performed through the mobile phone network 125. Indeed, safety measures implemented at the access point 130a (e.g., firewalls) can be quite easily breached by intruders. Moreover, there is not an analogous to the MSISDN in the WLAN 130; therefore, the user is not homogeneously, unambiguously and automatically identified while accessing the WLAN 130 through the communication device 120.

In such a scenario, let it be assumed that the mobile phone network 125 features a messaging service. Examples of suitable messaging services well-known in the art are text messaging services such as the SMS (Short Message Service), which uses standardized communications protocols that allow the exchange of short text messages between fixed or mobile devices, or USSD (Unstructured Supplementary Service Data), which is a GSM (Global System for Mobile communications) standard protocol used for communicating information with components of the telecommunication network 125 or external services through dedicated gateways. Alternatively or in combination, as better described later on, a customized application protocol can also be implemented for communicating information on data packets sent in a secure way in the telecommunication network 125. Let it be further assumed that the communication device 120 is set (e.g., by the user or by a default setting in the communication device 120) to access the Internet 110 through the WLAN 130 when the communication device 120 recognizes that the WLAN 130 is available, since it is expected that by using the WLAN 130 a faster and/or cheaper data transfer than using the mobile phone network 125 is achieved. A suitable Wi-Fi® access procedure may be performed to grant the communication device 120 access to the Wi-Fi® connection (based for example on one of the available access security standards such as WPA), but this is not essential: for example, in public Wi-Fi® areas (so called hotspots) access is in general freely available and hence it is not protected via any access security procedure.

Figure 2:
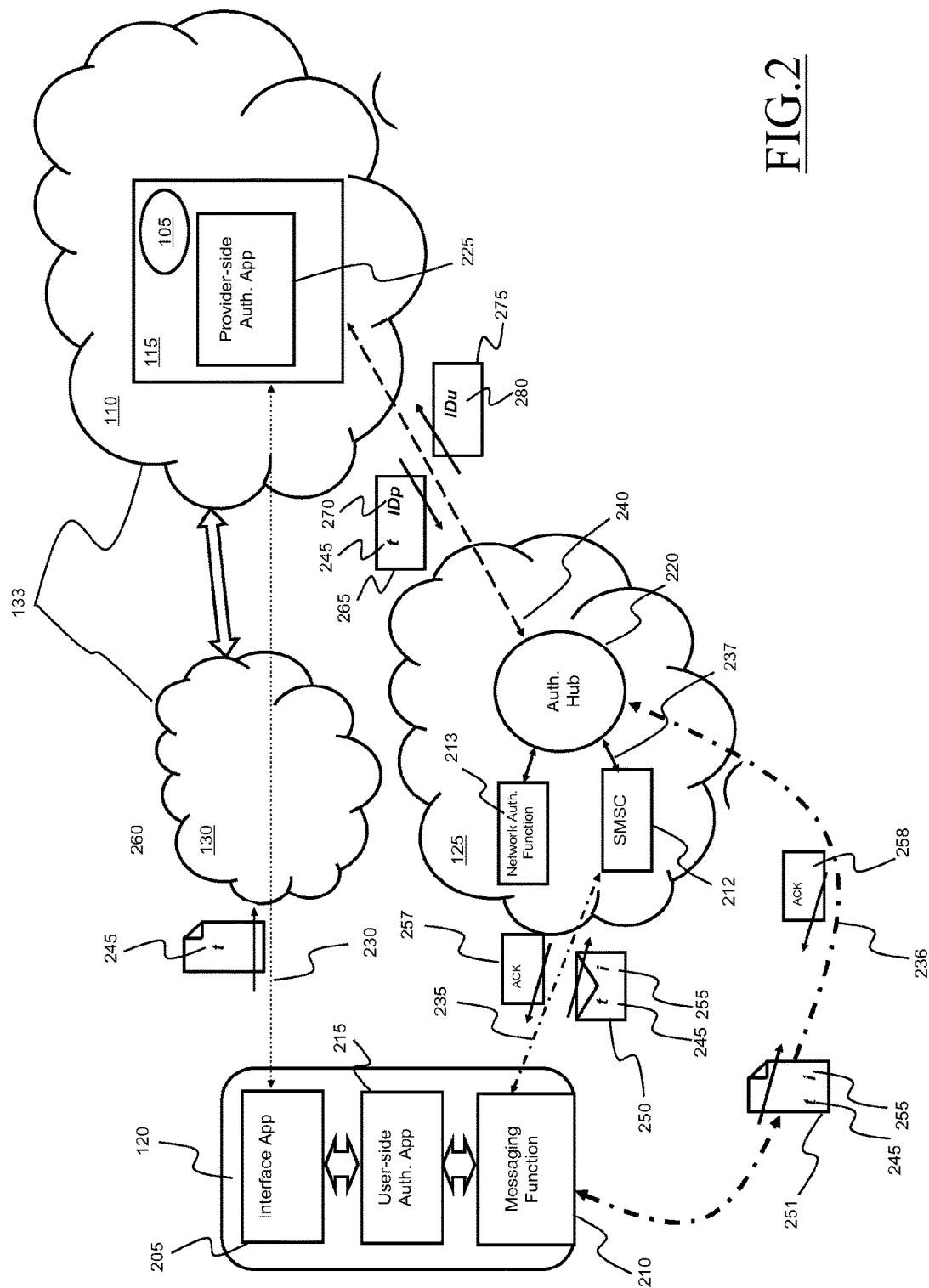
FIG. 2 is a schematic view of an authentication system for accessing one or more dedicated services according to an embodiment of the present invention.

Turning now to FIG. 2 an authentication system for accessing a dedicated service 105 according to an embodiment of the present invention is described.

The communication device 120 has an OS (Operative System), and has installed thereon an interface software application, or briefly interface app 205, for accessing over the Internet 110 online services, particularly one or more of the dedicated services 105 offered by one or more service providers by means of one or more of the service platforms 115, and the interface app 205 is capable of interacting with the mobile device user through a human-understandable interface, typically through a display and an input interface of the communication device 120. The interface app 205 can be a web-browsing software application or a dedicated software application specifically developed for accessing the one or more dedicated services 105. It is also assumed that the communication device 120 has a messaging function 210, e.g. a text messaging function adapted to access text messaging service(s) (e.g., SMS) or a USSD function through the mobile phone network 125 or a communication function using a customized application protocol over the mobile phone data network 125. For example, the messaging function 210 is configured for communicating with a SMSC 212 (Short Message Service Center) of the telecommunication network 125 for managing the delivery of (text) messages. The SMSC 212 is configured to receive, store and forward messages sent by the text messaging function 210 of the user communication device 120 to the intended recipient.

According to an embodiment of the present invention, the communication device 120 has installed thereon a user-side authentication software application, or briefly user-side authentication app 215, which performs the authentication procedure on the user side, as discussed in the following.

In the example at issue, the mobile phone network 125, or an associated dedicated services support center, comprises an authentication control function, denoted as authentication hub 220 in the following, which is adapted to receive from the SMSC 212 messages sent by the messaging function 210 in the communication device 120 and to communicate with one or more of the service platforms 115 (as described later on). In other embodiments according to the present invention, the mobile phone network 125 comprises an authentication control function, which may be the authentication hub 220, which is adapted to receive customized application protocol data packets 251 sent by the messaging function 210 in the communication device 120 and travelling over a highly-secure data link 236 and to communicate with one or more of the service platforms 115 (as described later on). The highly-secure data link 236 is for example a tunnel on the mobile phone network 125 with standard mobile user authentication, e.g. based on http enrichment (ciphered http, https, VPN). The mobile phone network 125 may include a network authentication function 213 which is capable of retrieving a user univocal identifier used to establish the highly-secure data link 236 through which the message 251 is sent.

In other embodiments according to the present invention, the authentication control function may be implemented at a single service platform 115 (i.e., a generic service platform 115 may have, co-located thereat, an authentication function similar to that performed by the authentication hub 220); in such a case, the authentication control function operates only in respect of the service platform 115 in which it is implemented. It should be noted that the authentication control function, e.g. the authentication hub 220 may be implemented via either hardware or software, or a mix thereof.

The generic service platform 115 comprises a provider-side authentication software application, briefly provider-side authentication app 225, which performs the authentication procedure on the content service provider side, as discussed in the following.

The user-side authentication app 215 is configured for establishing a communication link 230 with the service platform 115 through the WLAN 130. Conversely, the messaging function 210 is capable of establishing a high-security, SIM-authenticated message link 235 with the SMSC 212 in order to send messages to the authentication hub 220 through the mobile phone network 125. The SMSC 212 is capable of establishing another high-security message link 237 (within the mobile phone network 125) with the authentication hub 220 for forwarding text messages to the latter. In other embodiments of the present invention, the messaging function 210 is capable of establishing a highly-secure data link 236 with the authentication hub 220.

The authentication hub 220 is configured for establishing a high-security communication link 240 (e.g., a VPN—Virtual Private Network link) together with the provider-side authentication app 225.

Figure 3:
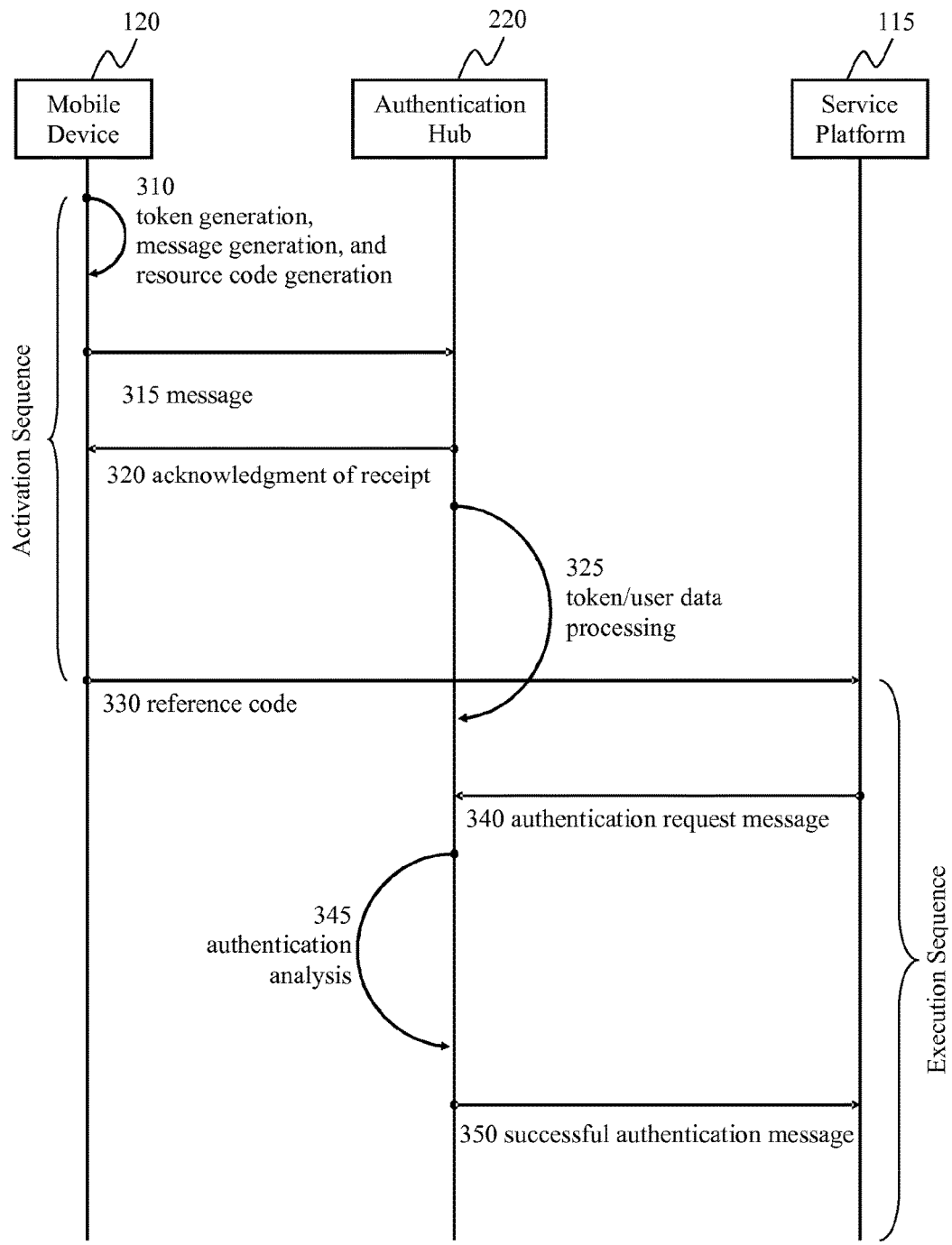
FIG. 3 is an action sequence diagram of an authentication process according to an embodiment of the present invention.

By making joint reference to the previous FIGS. 1 and 2 and to FIG. 3, which is an action sequence diagram of an authentication process according to an embodiment of the present invention, an operation of the authentication system for authenticating a user which tries to access a dedicated service 105 by means of a communication device 120 is now described.

Preferably, the authentication process is an asynchronous process, which comprises two main phases: an activation sequence and an execution sequence.

Initially, when the user tries to connect via the WLAN 130 to the service platform 115 for accessing the desired dedicated service 105, to which he/she has subscribed or intends to subscribe, the activation sequence is initiated. The user-side authentication app 215, which is aware of the specific type of data connectivity activated (e.g. based on specific functions made available by the Operating System of the device), generates a digital token, or simply token 245 (first phase 310 of the activation sequence).

The token 245 generated by the user-side authentication app 215 preferably includes:
  an installation timestamp (in any suitable format, e.g. Coordinated Universal Time or UTC) indicating a time of installation of the user-side authentication app 215 on the communication device 120;
  a generation timestamp (e.g., in UTC format) indicating the time at which the token has been generated by the user-side authentication app 215.

The user-side authentication app 215 may also generate, in addition to the token 245, at least one additional subsequent token, e.g. a number N of subsequent tokens, to be used (as explained later on) for possible subsequent, additional accesses of the user to the same dedicated service 105 during a certain time period from the first access. The additional, subsequent tokens can be generated using a token rotation key, i.e. a coding key used by the user-side authentication app 215 to generate in sequence the number N of additional subsequent tokens, e.g. such additional subsequent tokens may be generated by means of recursive application of well-known hash functions (such as SHA-2, RIPMED, etc.) to a combination of the token rotation key with the token 245.

The user-side authentication app 215 generates (still first phase 310 of the activation sequence) a message 250 or a data packet 251 containing the generated token 245 and possibly other additional information 255 (as described in the following). The messaging function 210 sends the message 250 or the data packet 251 generated by the user-side authentication app 215 through the high-security, SIM-authenticated message link 235 to the SMSC 212 or, alternatively, through the highly-secure data link 236 to the authentication hub 220. The message 250 received at the SMSC 212 is then forwarded to the authentication hub 220 (second phase 315 of the activation sequence); in case the data packet 251 is sent over the highly-secure data link 236, the data packet 251 is received at the authentication hub. The authentication hub 220 can for example be identified—for the purpose of sending the message 250 to it—by a dedicated SMS large account assigned to the authentication hub 220 by the mobile phone network 125 (or, in the case of use of USSD messages, by a USSD identifier of the authentication hub 220). The message is preferably sent, under control of the user-side authentication app 215, as a silent message (e.g., a silent SMS), which is automatically generated and sent by the mobile device 120 without the need of any action by the user. For example, an API (Application Programming Interface) of the OS of the communication device 120 may be configured for automatically invoking and managing the operation of the messaging function 210 (for sending an SMS or a USSD message) upon instruction from the user-side authentication app 215. If the messaging function 210 sends the data packet 251 over the highly-secure data link 236, the communication procedure is also performed silently without need of any action by the user.

The token 245 generated by the user-side authentication app 215 comprises information that is encrypted, preferably but not limitatively, by means of a suitable hash function (well known in the art and thus not herein described). Information contained in the token 245, for example, comprises:
  i. the installation timestamp;
  ii. the generation timestamp; and
  iii. an identifier of the dedicated service 105 (e.g., in binary code) for which authentication is requested.

Examples of additional information 255 which may be comprised in the message 250 or in the data packet 251 (preferably, encrypted in a similar way as for the token) are:
  a) a validity time indicating a time period (e.g., a binary code string representing a value in seconds or minutes), starting from the above mentioned generation timestamp, for which the generated and sent token 245 (and possible subsequent tokens which, as explained in detail later on, can be generated subsequently to the generation of the first token—which is generated when the user firstly tries to connect to the service platform 115 for accessing the desired dedicated service 105—for possible subsequent, additional accesses of the user to the same dedicated service 105) will be considered valid;
  b) an integer number representing the number N of the above-mentioned additional, subsequent tokens that have been generated by the user-side authentication app 215 and that have to be generated by the authentication hub 220 and stored together with the token 245 comprised in the current message 250 (as detailed in the following);

c) the token rotation key N;
d) a version/release of the user-side authentication app 215 implemented (e.g., in binary code);
e) a unique identification code for the communication device 120 (e.g., the International Mobile Equipment Identity, or IMEI, code in GSM standard);
f) general information on the communication device 120 (e.g., in binary code), such as model, type and version of the used OS; and/or
g) a code identifying the mobile phone network 125 used by the communication device 120 (e.g., the Operator ID code in GSM standard).

The validity time should be selected also taking into account the communication link speed used. For example, the transmission of the message 250 containing the token 245 may be considered as the slower phase of the authentication procedure; therefore, the validity time should be selected to be at least equal to a minimum time period required to deliver the message 250 to the authentication hub 220.

Once the message 250 or the data packet 251 comprising the token 245 and the additional information 255 has been received at the authentication hub 220, the authentication hub 220 preferably sends an acknowledgement of receipt message 257 of the message (e.g., by means of a DSR or Delivery Status Report in a GSM-type mobile telecommunication network) back to the (user-side authentication application 215 in the) communication device 120 (third phase 320 of the activation sequence). If the additional information in the data packet 251 is received at the authentication hub 220, the authentication hub 220 preferably sends an acknowledgement of receipt message 258 of the message (e.g., by means of a success return code) back to the (user-side authentication application 215 in the) communication device 120 (third phase 320 of the activation sequence). Advantageously, the user-side authentication app 215 may be configured for sending a new message, preferably with a new token and additional information, if the acknowledgement of receipt from the authentication hub 220 is not received within a predetermined time period (e.g., equal to or lower than the validity time).

Then, in the next, fourth phase (data processing phase 325) the authentication hub 220 extracts, decodes and stores (e.g., in a memory not shown) the token 245 contained in the received message 250 or in the data packet 251, retrieves and stores the user univocal identifier (e.g., the MSISDN) obtained by the SMSC 212 from the high-security, SIM-authenticated message link 235 through which the message 250 comprising the token 245 has been received or obtained by the network authentication function 213 which is able to retrieve the user univocal identifier used to establish the highly-secure data link 236 through which the message 251 comprising the token 245 has been received, and associates the same with the received token 245. In this way, the authentication hub 220 is able to securely and unambiguously determine the user who sent the token 245. The token 245 is deemed to be unique; should however the authentication hub 220 receive another token with the same value randomly generated by another devices it will discard it and not consider it valid for any authentication.

In addition, the authentication hub 220 extracts from the received message 250 the generation timestamp from the token 245 and, from the additional information 255 contained in the received message 250, the validity time, and possibly other pieces of the additional information 255, some of which, like the general information on the communication device 120, can be stored for statistical analysis.

The authentication hub 220 then analyzes the token 245 and at least some pieces of the additional information 255 included in the message 250 in order to perform the authentication. Particularly, the validity time is used to determine the time interval during which the token will be considered valid for authentication.

The authentication hub 220 makes an association of the token 245 with the (communication device 120 of the) user who sent it (identified by the corresponding user univocal identifier, e.g. the MSISDN) and the validity time.

In case the additional information includes the number N and the token rotation key, by using the token rotation key the authentication hub 220 generates and stores a number N of additional subsequent tokens, corresponding to the N additional tokens generated at the communication device 120, and associates all of them with the corresponding user univocal identifier (e.g. the MSISDN) and the validity time, thus storing a total of N+1 tokens to be considered valid for possible authentication requests during the validity time period.

Meanwhile, once the acknowledgement of receipt message has been received at the communication device 120, the user-side authentication app 215 automatically generates a reference code 260, for example a URL (Uniform Resource Locator), for accessing the desired dedicated service 105 on the service platform 115; the reference code 260 comprises the token 245 generated and sent to the authentication hub 220. The reference code 260 comprising the token 245 is used by the interface app 205 for reaching the dedicated service 105 on the service platform 115 through the communication link 230 (fifth phase 330 of the activation procedure), preferably via encryption protected Internet protocols such as Hypertext Transfer Protocol Secure (HTTPS).

At this point, the provider-side authentication app 225 on the service platform 115 starts the execution sequence.

The provider-side authentication app 225 requests for an authentication check to the authentication hub 220, by sending to the latter an authentication request message 265 comprising the token 245 received from the communication device 120 (retrieved by the provider-side authentication app 225 from the reference code 260 received from the communication device 120) together with an identifier 270 of the service platform 115 (first phase 340 of the execution sequence) making the request. For example, another API implemented in the authentication hub 220 may be used for managing the communication with the provider-side authentication app 225 (through the high-security communication link 240).

The authentication hub 220 performs an analysis phase (second phase 345 of the execution sequence) on the information comprised in the authentication request message 265. The authentication hub 220 firstly verifies if the service platform 115 indicated by the identifier comprised in the authentication request is qualified to apply for authentication requests to the authentication hub 220. In the negative case, the authentication request is rejected and a notification of such rejection may be sent to the provider-side authentication app 225.

In the affirmative case, the authentication hub 220 compares the token 245 received with the message 250 or with the data packet 251 from the mobile device 120 with the token 245 contained in the authentication request message 265 (i.e., the token retrieved by the provider-side authentication app 225 from the reference code received from the mobile device 120). If the tokens 245 do not match, the authentication hub 220 returns an authentication error message to the to the service platform 115, which in such a case does not grant to the user the requested access to the dedicated service 105, and may send an authentication failure message to the communication device 120.

In case the tokens 245 match, the authentication hub 220 checks if the authentication request message 265 from the service platform 115 is received within the validity time previously stored and associated with the stored token 245. In the negative case, the authentication hub 220 returns a timeout error message to the provider-side authentication app 225 and, preferably, a notification of denial of the access to the dedicated service 105 may be issued to the communication device 120 by the provider-side authentication app 225; in such case, the user-side authentication app 215 may be configured for restarting the activation sequence by generating a new token.

In the affirmative case, the authentication is successful and the authentication hub 220 sends to the provider-side authentication app 225 a successful authentication message 275 comprising the user univocal (e.g., the MSISDN) identifier 280 (third phase 350 of the execution sequence), thus ending the authentication process. The authentication hub 220 marks (flags) the token 245 as "used" and keeps the possible additional subsequent N tokens for further authentications of the same communication device 120 corresponding to further, subsequent requests to access the dedicated service 105 during the validity period. At the expiry of the validity period, the authentication hub 220 marks all the unused tokens as "expired" and therefore discards them, as they will be not valid for authentication.

Similarly, the user-side authentication app 215 marks the token 245 as "used" after having been granted the access to the dedicated service 105 (i.e. after the successful conclusion of the authentication as above described). Should the need arise for the user to perform further accesses to the dedicated service 105 (e.g., the service platform 115 implements a policy granting access to dedicated service 105 only for a predetermined period of time after a successful authentication), the user-side authentication app 215 can generate only a further resource code (not shown) comprising a selected one of the number N of additional, subsequent tokens. For example, user-side authentication app 215 and the authentication hub 220 may be configured to use the possible additional subsequent N tokens according a predetermined order of use (e.g., defined by the token rotation key).

Then, the interface app 205 uses the further resource code for reaching the dedicated service 105 on service platform 115. Again, the provider-side authentication app 225 requests for a further authentication check to the authentication hub 220, by sending thereto a further authentication request message comprising the selected subsequent token as retrieved from the further reference code received from the communication device 120.

The authentication hub 220 performs the execution sequence as above described, with the difference that the selected subsequent token is compared with a corresponding subsequent token already stored in the authentication hub 220 (according to the order of use defined by the token rotation key). In this way, the authentication procedure for the possible additional subsequent N tokens is faster than the authentication procedure of the token 245, since there is no need to generate and send any message towards the authentication hub 220.

Alternatively, the user-side authentication app 215 may be configured to use the possible additional subsequent N tokens randomly; therefore, the authentication hub 220 is configured to compare with each one of the additional subsequent N tokens stored in authentication hub 220.

The user-side authentication app 215, can detect, e.g. by means of specific OS APIs, change of SIM card in the device 120. In case such SIM card change is detected, e.g. at device power-up, the user-side authentication app 215 will perform an initialization sequence, including deletion of any unused tokens stored whose validity time is not yet expired. Depending on the application and on the specific mobile system used, similar measures can be adopted to further enhance the flexibility of the solution.

As a further addition or alternative, the validity time, instead of defining a maximum time period, may be set (e.g., by using a special string) to enable only a single use of the token 245 and the additional subsequent N tokens and discard any subsequent request containing any of the additional N token available. Therefore, the user is correctly authenticated and the service platform 115 can safely grant to the user access to the desired dedicated service 105 as indicated in the reference code previously sent.

In this way, the method advantageously provides a way to support secure subsequent authentication requests, even if the WLAN 130 is used to transfer the token to the platform 115 without any security measure; e.g., without implementing the encryption protected Internet protocols such as HyperText Transfer Protocol Secure (HTTPS).

The authentication system and method according to the described embodiment of the present invention provide a safe, fast and low-cost authentication method that is adapted to authenticate in real time a user requesting the access to a dedicated service 105 in an automated manner (i.e., in a manner that is completely transparent for the user).

Moreover, the tokens generated by the user-side authentication app 215 and compared at the authentication hub 220 enhance the overall security of the authentication procedure. Particularly, by generating the token at the communication device 120 it is more difficult for an unauthorized third party to unduly use the token before the user does or the token validity time expires, since the third party can only retrieve the token by spying over the packet data network communication link 230, that is when the authentication execution procedure is about to start; in such case, should the third party device send the token to the service platform 115, the provider side authentication app 225, by detecting a second access with the same token already processed, will detect an improper authentication attempt and discard the token. The same applies to subsequent authentication requests based on any one of the N subsequent tokens.

Moreover a third party device sending the token retrieved by spying the communication link 230 to the authentication hub 220 will not be authenticated since a subsequent copy of an already received token will be detected by the authentication hub 220 and the associated identification (e.g. MSISDN) will not be taken into account for completing the authentication procedure.

It should also be noted that the authentication system and method according to the described embodiment of the present invention are adapted to make the authentication procedure available to a plurality of users each accessing, by means of a respective communication device 120, dedicated services 105 on a same or on a plurality of different service platforms 115 served by the authentication hub 220.

Moreover, the authentication system according to the described embodiment of the present invention may be easily implemented with minimum efforts on existing communication devices 120, service platforms 115 and mobile telecommunication networks 125, since it can be completely implemented via a limited number of low complexity software functions (even though, hardware implementations or mixed hardware-software implementations are not excluded for special purpose applications).

Additionally, by proper selection of parameters (integer N, token rotation key, validity time, etc.) the authentication system and method according to the described embodiment of the present invention can be easily adapted (i.e., customized) to satisfy various authentication needs of the plurality of different services platforms 115 in a cost-effective way.

Moreover, the authentication system according to the described embodiment of the present invention can support transparent secure access (i.e., authenticated access to services irrespective to the access network used by the user and with no specific user intervention such as use of access credentials) with performance and security levels adequate to supporting a wide variety of services.

Figure 4:
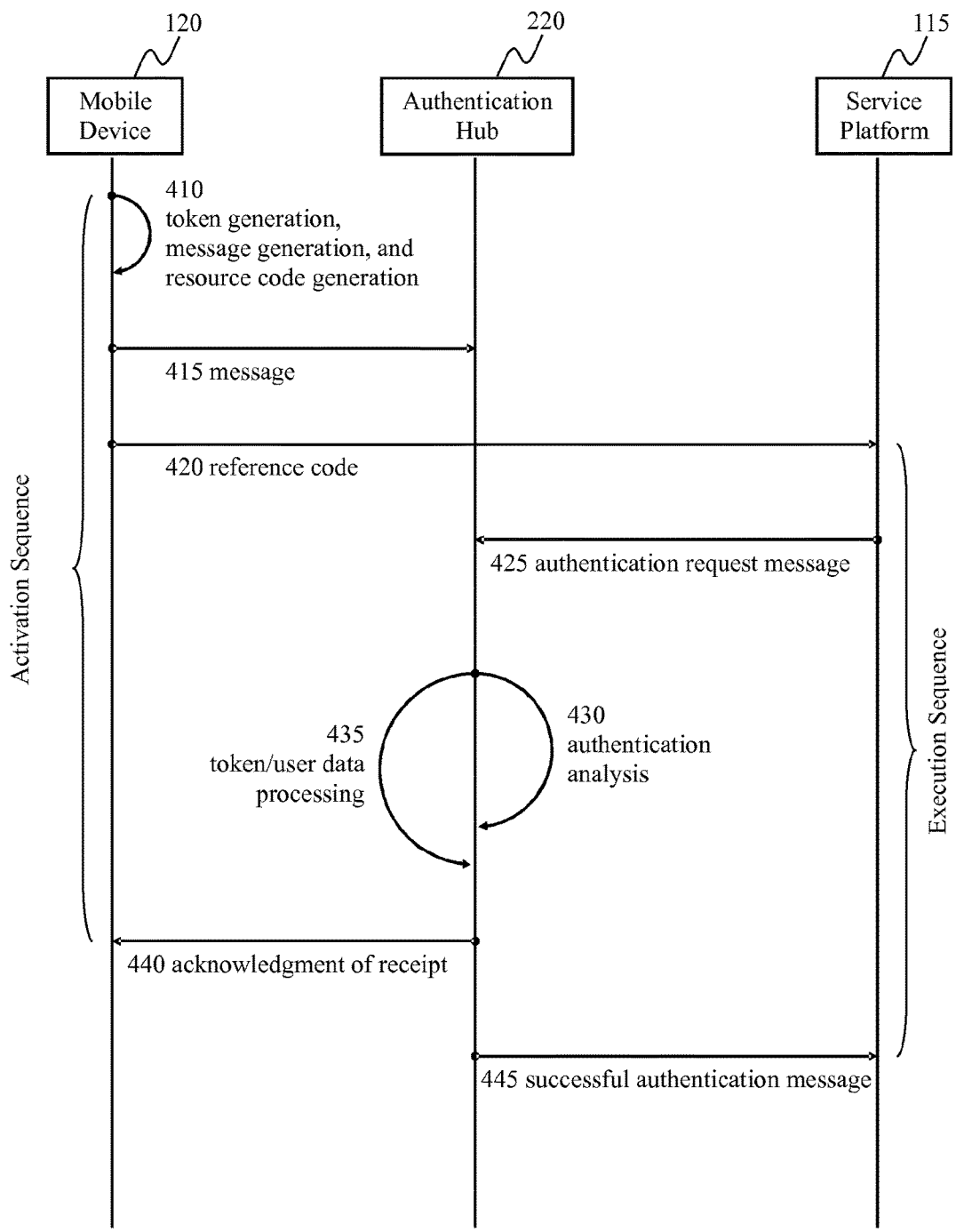
FIG. 4 is an action sequence diagram of an authentication process according to another embodiment of the present invention.

Considering now FIGS. 1 and 2 jointly with FIG. 4, which is an action sequence diagram of an authentication process according to another embodiment of the present invention, an alternative operation of the authentication system is now described.

The alternative operation of the authentication system is slightly more asynchronous than the previously described operation, and the former differs from the latter in what follows.

The main difference resides in that in the embodiment of FIG. 4 the user-side authentication app 215 does not wait for an acknowledgement of receipt from the authentication hub 220 before providing the reference code 260 (e.g., an URL as previously described) for accessing the dedicated service 105 to the interface app 205. Therefore, the activation sequence and the execution sequence may result to be (at least) partially overlapping.

Initially, when the user tries to connect to the service platform 115 for accessing the dedicated service 105 for which he/she has subscribed, the activation sequence is initiated. The user-side authentication app 215 generates the token 245 (first phase 410 of the activation sequence), as described in respect of the previous embodiment. Still in the first phase 410, the message 250 is generated as described in respect of the previous embodiment, and the generated message is sent to the authentication hub 220 through the high-security, SIM-authenticated message link 235 and the SMSC 212 (second phase 415 of the activation sequence). Then, the user-side authentication app 215 automatically generates the reference code 260 for accessing the dedicated service 105 on the service platform 115 comprising the generated token 245. The reference code 260 comprising the token 245 is used by the interface app 205 for reaching the dedicated service 105 on the service platform 115 through the communication link 230 (third phase 420 of the activation procedure).

Upon reception of the reference code 260 at the service platform 115, the execution sequence is initiated, while the activation sequence is still ongoing. The provider-side authentication app 225 requests for an authentication check to the authentication hub 220 through the authentication request message 265 comprising the token 245 (retrieved from the received reference code 260 by the provider-side authentication app 225) together with the identifier 270 of the service platform 115 (first phase 425 of the execution sequence).

The authentication hub 220 starts to perform an analysis phase (second phase 430 of the execution sequence) similarly as previously described in respect of the previous embodiment, and, at the same time, the authentication hub 220 starts performing the data processing phase (fourth phase 435 of the activation sequence). In the data processing phase, the authentication hub 220 stores the token 245 received through the message 250 received from the communication device 120, the user univocal identifier (MSISDN), associates one another and performs similar operations on the additional information 255 provided in the message 245 as previously described. Particularly, the authentication hub 220 extracts from the token 245 the generation timestamp and from the additional information 255 the validity time.

In the example at issue, the authentication hub 220 may send the acknowledgement of receipt of the message to the communication device 120 (fifth phase 440 of the activation sequence) at any time between the receipt of the message 250 from the communication device 120 at the authentication hub 220 (through the SMSC 212) and the expiry of the predetermined time for receiving, at the communication device 120, the acknowledgement of receipt, or the validity time, without prejudice for the authentication procedure.

Afterwards, the execution sequence proceeds similarly as previously described (i.e., the authentication hub 220 verifies the entitlement of the service platform 115 to performing authentication requests, verifies the compliance of the tokens 245 with the validity time, and compares the tokens 245).

Eventually, if the analysis has a positive outcome (i.e., validity time is respected, the receiving platform 115 is recognized, and the token received via the message sent by the communication device 120 matches the token provided by provider-side authentication app 225) the authentication is successful and the authentication hub 220 sends the successful authentication message comprising the user univocal identifier to the service platform 115 (third phase 445 of the execution sequence).

Therefore, the authentication procedure is completed, the user is correctly authenticated and the service platform 115 grants access to the dedicated service 105 as indicated in the URL previously sent.

If on the contrary the tokens 245 do not match, the authentication hub 220 returns an authentication error message to the to the service platform 115, which in such a case does not grant to the user the requested access to the dedicated service 105, and may send an authentication failure message to the communication device 120.

The alternative authentication process just described shares the same advantages of the authentication process previously described while it may provide a faster authentication process by performing steps, at least partly, in parallel and/or overlapping.

It should be noted that the authentication system may easily switch between the two authentication processes herein described according to the present invention. Indeed, it is sufficient to define an operative Boolean parameter at the user-side authentication application 215, a first value of which (e.g., true value) causes the authentication application 215 to wait for the acknowledgement of receipt prior to generate the reference code for accessing to the dedicated service 105 (thus implementing the authentication process firstly described), while a second value (e.g., false) removes such constraint (thus implementing the alternative authentication process).

In addition the authentication hub 220 may be configured for storing other information encoded in the token such as the information on the communication device 120, the installation timestamp and the version/release identifier of the user-side authentication app 215. Such information may be stored in a database and used for statistical analysis about the use of the authentication system herein described and/or be provided to the provider of the service for similar analysis. Moreover, the version/release identifier of the user-side authentication app 215 may be used for automatically deploying an updated version/release of the user-side authentication app 215 on the communication device 120.

The invention claimed is:

1. A communication device configured to be used by a user for accessing an online service, accessible over a data network and being provided through a service platform, the communication device being connectable both to a mobile phone network and to the data network, the communication device comprising:
    an antenna;
    an interface configured to interact with the service platform through the data network for fruition of the online service and, subject to secure user authentication, to allow fruition of the online service by the user;
    a messenger configured to send messages through the mobile phone network;
    a user-side authentication application configured to generate a digital token and to generate a message, including the digital token, to be sent by the messenger to an authentication control function connected to the mobile phone network, and to generate at least one resource code, including the digital token and identifying the online service for which access is requested at the service platform, the resource code to be sent by the interface to the service platform via the data network for the user authentication, the message including a validity time indicating a time period for which the digital token is valid, the validity time being determined based on a link communication speed of a link between the service platform and the communication device via the data network,
    wherein the user-side authentication application is further configured to generate, in addition to the digital token, at least one additional digital token to be stored at the communication device, the at least one additional token being generated using a same coding key used by the user-side authentication application to generate all tokens.

2. The communication device according to claim 1, wherein the user-side authentication application is further configured to encrypt in the digital token information comprising:
    a generation timestamp indicating a time instant at which the digital token was generated by the user-side authentication application, and
    an identifier of the online service to be accessed.

3. The communication device according to claim 2, wherein the time period for which the digital token is valid is measure from the timestamp.

4. The communication device according to claim 1, wherein the user-side authentication application is further configured to encrypt in the message additional information further comprising at least one of:
    an integer number corresponding to the number of additional tokens;
    the coding key;
    a unique identification code for the communication device;
    information on the communication device type;
    an indication of a version of the user-side authentication application implemented at the communication device;
    an installation timestamp indicating a time at which the user-side authentication application was installed on the communication device, and
    a code identifying the mobile phone network to which the communication device is connected.

5. The communication device according to claim 1, wherein the user-side authentication application is further configured to provide the message to the messenger, the messenger being configured to establish a message link with a messaging management center comprised in the mobile phone network for sending the message to the authentication control function, the message link being associated with a univocal identifier of the user of the communication device.

6. The communication device according to claim 5, wherein the messenger is further configured to send the message through the message link automatically without intervention of the user.

7. The communication device according to claim 1, wherein the user-side authentication application is further configured to provide the message to the messenger, the messenger being configured to establish a secure data link over the mobile phone network for sending the message to the authentication control function, the user of the communication device being identified, in the secure data link, by a univocal identifier.

8. The communication device according to claim 1, wherein the user-side authentication application is further configured to provide the at least one resource code to the interface, the interface being configured to establish a communication link via the data network with the service platform for sending the resource code thereto.

9. An authentication system configured to authenticate a user accessing an online service, accessible over a data network and being provided through a service platform, by a communication device being at least connected to both a mobile phone network and to the data network, comprising:
    a communication device according to claim 1;
    an authentication control device; and
    a service system.

10. An authentication control device configured to authenticate a user accessing an online service, accessible over a data network and being provided through a service platform, by a communication device being at least connected to both a mobile phone network and the data network, the authentication control device comprising at least a memory,
    wherein the authentication control device is in communication relationship with the service platform and with the mobile phone network, and
    wherein the authentication control device is configured to:
        extract a first digital token comprised in at least one message sent from the communication device via the mobile phone network to the authentication controller, the at least one message including a validity time indicating a time period for which the first digital token is valid, the validity time being determined based on a link communication speed of a link between the service platform and the authentication control device via the phone network; and
        extract a second digital token from at least one authentication request message sent from the service platform to the authentication controller; and
    wherein the authentication control device is configured to compare the first and second digital tokens respectively received from the mobile communication device and from the service platform and to notify to the service platform of a successful user authentication in case the two digital tokens match, and wherein the authentication control device is further configured to extract at least one subsequent digital token generated by the communication device with a same coding key as the first digital token, and to compare the subsequent digital token with another digital token from the service platform, the subsequent digital token corresponding to a subsequent request.

11. The authentication control device according to claim 10, further configured to:
   extract a generation timestamp from the first digital token extracted from the message sent from the communication device;
   receive from the mobile phone network a univocal identifier of the user of the communication device; and
   verify if a time period indicated in the validity time has elapsed from the time instant indicated in the generation timestamp.

12. The authentication control device according to claim 10, further configured to:
   extract from additional information comprised in the message:
      a number indicative of a number of additional digital tokens, the additional digital tokens including the subsequent digital token;
      the coding key; and
   generate the number of additional digital tokens.

13. The authentication control device according to claim 10, further configured to extract from additional information comprised in the message:
   a unique identification code for the communication device;
   information on the communication device type;
   an indication of a version of the user-side authentication application implemented at the communication device;
   an installation timestamp indicating a time at which the user-side authentication application was installed on the communication device; and
   a code identifying the mobile phone network to which the communication device is connected.

14. The authentication control device according to claim 10, provided within the mobile phone network, and further configured to communicate with two or more service platforms.

15. The authentication control device according to claim 10, being co-located at the service platform.

16. A service system configured to provide at least one online service, accessible over a data network upon authentication of a user requesting access to the online service, by a communication device being at least connected to both a mobile phone network and to the data network, comprising:
   a provider-side authentication application provided at the service system, including at least a server, and configured to extract a digital token from at least one resource code received at the service system, the resource code identifying the online service for which access is requested by the user, to generate at least one authentication request message comprising the received digital token, and to send the authentication request message to an authentication control function via a secured communication link, the one resource code including a validity time indicating a time period for which the digital token is valid, the validity time being determined based on a link communication speed of a link through which the resource code was received; and
   wherein the provider-side authentication application is further configured to receive a successful authentication message from the authentication control function, whereby the service system grants to the user access to the online service,
   wherein authentication is determined based on a comparison of the digital token with one or more digital tokens generated by the communication device using a same key.

17. The service system according to claim 16, wherein the provider-side authentication application is further configured to extract a univocal identifier of the user of the communication device from the successful authentication message.

18. An authentication method for authenticating a user accessing an online service, accessible over a data network and being provided through a service platform, by a mobile communication device being at least connected to a mobile phone network and to the data network, the communication device comprising an interface software application configured to interact with the service platform through the data network for fruition of the online service, and a messaging function configured to send messages through the mobile phone network, and wherein:
   a user-side authentication application is provided at the mobile communication device;
   a provider-side authentication application is provided at the service platform; and
   an authentication control function is provided in communication relationship with the provider-side authentication application and with the mobile phone network;
   the method comprising:
   generating, by the user-side authentication application, a digital token at the communication device;
   generating, by the user-side authentication application, at least one additional digital token using a same coding key used to generated the digital token;
   storing the at least one additional digital token in the mobile communication device for subsequent use;
   generating, by the user-side authentication application, a message, including the digital token, at the communication device, the message including a validity time indicating a time period for which the digital token is valid, the validity time being determined based on a link communication speed of a link between the service platform and the communication device via the data network;
   sending, by the messaging function, the message from the communication device to the authentication control function connected to the mobile phone network;
   generating, by the user-side authentication application, at least one resource code at the communication device including the digital token and identifying the online service for which access is requested at the service platform;
   sending, by the interface software application, the resource code from the communication device to the service platform via the data network for the user authentication;
   extracting, by the provider-side authentication application, the digital token from the resource code received at the service platform;
   generating, by the provider-side authentication application, at least one authentication request message comprising the received digital token at the service platform;
   sending, by the provider-side authentication application, the authentication request message from the service platform to the authentication control function via a secured high-communication link;

extracting, at the authentication control function, the digital token comprised in the message sent from the communication device via the mobile phone network and forwarded to the authentication control function;

extracting, at the authentication control function, the digital token from the authentication request message sent from the service platform to the authentication control function;

comparing, at the authentication control function, the digital tokens received from the communication device and from the service platform at the authentication control function; and sending a successful authentication message from the authentication control function to the service platform indicating a successful user authentication in case the two digital tokens match, whereby the service platform grants to the user access to the online service.

* * * * *